(12) United States Patent
Short et al.

(10) Patent No.: US 9,127,661 B2
(45) Date of Patent: Sep. 8, 2015

(54) BOOTSTRAP ACCUMULATOR SYSTEM WITH TELESCOPING ACTUATOR CYLINDER

(75) Inventors: Keith E. Short, Rockford, IL (US); Dean A. Norem, Cherry Valley, IL (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 774 days.

(21) Appl. No.: 13/096,030

(22) Filed: Apr. 28, 2011

(65) Prior Publication Data

US 2012/0097021 A1 Apr. 26, 2012

Related U.S. Application Data

(60) Provisional application No. 61/406,228, filed on Oct. 25, 2010.

(51) Int. Cl.
| | |
|---|---|
| F04B 39/00 | (2006.01) |
| F04B 11/00 | (2006.01) |
| F04B 49/08 | (2006.01) |
| F16J 3/06 | (2006.01) |

(52) U.S. Cl.
CPC ............. F04B 39/00 (2013.01); F04B 11/0025 (2013.01); F04B 49/08 (2013.01); F16J 3/06 (2013.01); *F04B 2205/01* (2013.01); *F15B 2201/32* (2013.01)

(58) Field of Classification Search
CPC ...... F04B 39/00; F04B 49/08; F04B 11/0025; F04B 2205/01; F16J 3/06
USPC .......................... 91/4 R; 92/107, 108; 138/31
See application file for complete search history.

(56) References Cited

U.S. PATENT DOCUMENTS

| | | | | | |
|---|---|---|---|---|---|
| 191,516 | A | * | 6/1877 | Comings | 60/565 |
| 732,142 | A | * | 6/1903 | Tuggle et al. | 254/2 B |
| 1,522,931 | A | * | 1/1925 | Wirz | 138/31 |
| 1,663,647 | A | * | 3/1928 | Brush | 137/565.19 |
| 1,987,609 | A | * | 1/1935 | Dinzl | 138/31 |
| 2,352,041 | A | * | 6/1944 | Van Den Berg | 138/31 |
| 2,353,692 | A | * | 7/1944 | Cunningham | 91/368 |
| 2,720,220 | A | * | 10/1955 | Gratzmuller | 138/31 |
| 2,721,446 | A | * | 10/1955 | Bumb | 60/415 |
| 2,780,064 | A | * | 2/1957 | Sharp et al. | 60/415 |
| 2,780,065 | A | * | 2/1957 | Spannhake | 60/475 |
| 2,809,596 | A | * | 10/1957 | Sullwold et al. | 137/565.17 |
| 3,015,345 | A | * | 1/1962 | Michael | 138/31 |

(Continued)

FOREIGN PATENT DOCUMENTS

| | | | |
|---|---|---|---|
| EP | 0356780 | * | 3/1990 |
| FR | 543441 | * | 9/1922 |

(Continued)

OTHER PUBLICATIONS

EP0356780—Machine translation to English from German.*

(Continued)

*Primary Examiner* — Edward Look
*Assistant Examiner* — Michael Quandt
(74) *Attorney, Agent, or Firm* — Carlson, Gaskey & Olds, P.C.

(57) ABSTRACT

A bootstrap accumulator system includes an actuator cylinder that drives an accumulator piston through a multiple of nested actuator sleeves, comprising a multistage actuator cylinder.

10 Claims, 3 Drawing Sheets

(56) References Cited

U.S. PATENT DOCUMENTS

| | | | |
|---|---|---|---|
| 3,047,023 A * | 7/1962 | Dick | 138/31 |
| 3,094,317 A * | 6/1963 | Axthammer | 267/64.16 |
| 3,351,097 A * | 11/1967 | Moran | 138/30 |
| 3,424,202 A * | 1/1969 | Lincicome | 138/31 |
| 3,942,323 A * | 3/1976 | Maillet | 60/413 |
| 4,014,213 A * | 3/1977 | Parquet | 73/290 R |
| 4,067,381 A * | 1/1978 | Lord | 165/11.1 |
| 4,095,762 A | 6/1978 | Holt | |
| 4,243,856 A | 1/1981 | Gratzmuller | |
| 4,282,837 A | 8/1981 | Holtman et al. | |
| 4,302,170 A | 11/1981 | Goron | |
| 4,355,280 A | 10/1982 | Duzich | |
| 4,376,619 A * | 3/1983 | Haushalter et al. | 417/540 |
| 4,461,322 A | 7/1984 | Mills | |
| 4,538,972 A * | 9/1985 | Gooden | 417/540 |
| 4,644,976 A | 2/1987 | Peter et al. | |
| 4,691,739 A * | 9/1987 | Gooden | 138/31 |
| 4,745,745 A * | 5/1988 | Hagin | 60/414 |
| 4,867,294 A | 9/1989 | de Tuesta | |
| 4,878,519 A | 11/1989 | Berding et al. | |
| 4,881,725 A | 11/1989 | Shioda et al. | |
| 5,024,250 A | 6/1991 | Nakamura | |
| 5,029,776 A * | 7/1991 | Jakubowski et al. | 244/137.4 |
| 5,148,834 A | 9/1992 | Reinartz et al. | |
| 5,354,187 A | 10/1994 | Holland et al. | |
| 5,363,744 A | 11/1994 | Pichler | |
| 5,974,910 A | 11/1999 | Paykin et al. | |
| 6,024,114 A | 2/2000 | Thomas et al. | |
| 6,332,477 B1 | 12/2001 | Scholl et al. | |
| 6,466,883 B1 | 10/2002 | Shim | |
| 6,851,349 B2 * | 2/2005 | Dohallow | 91/169 |
| 6,899,211 B2 | 5/2005 | Carne | |
| 6,923,215 B2 | 8/2005 | Weber | |
| 7,108,016 B2 | 9/2006 | Moskalik et al. | |
| 7,182,194 B2 | 2/2007 | Ronk et al. | |
| 7,395,838 B2 | 7/2008 | Weber et al. | |
| 7,516,760 B2 | 4/2009 | Weber | |
| 7,779,745 B2 * | 8/2010 | Porel | 92/19 |

FOREIGN PATENT DOCUMENTS

| | | | |
|---|---|---|---|
| GB | 1176148 | * | 1/1970 |
| GB | 1336995 | | 11/1973 |
| JP | 5-340408 | | 6/1992 |
| JP | 4-105602 | | 9/1994 |
| JP | 2005-532519 | | 10/2005 |
| WO | 2004/007975 | | 1/2004 |

OTHER PUBLICATIONS

FR543441 Machine translation of "Description" to English. 1922.*
EP0356780—Machine translation to English from German. Mar. 1990.*
Extended EP Search Report mailed Feb. 21, 2012, EP Application No. 11184744.8.

* cited by examiner

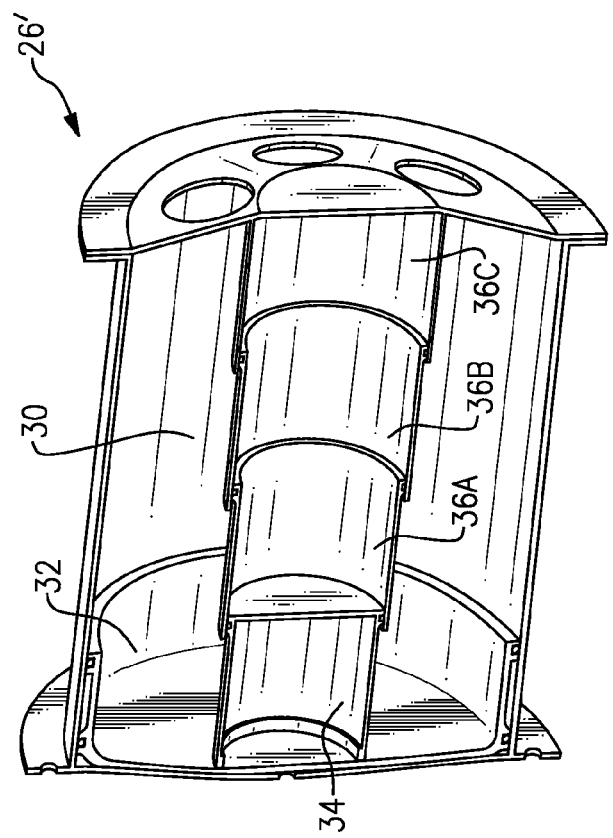
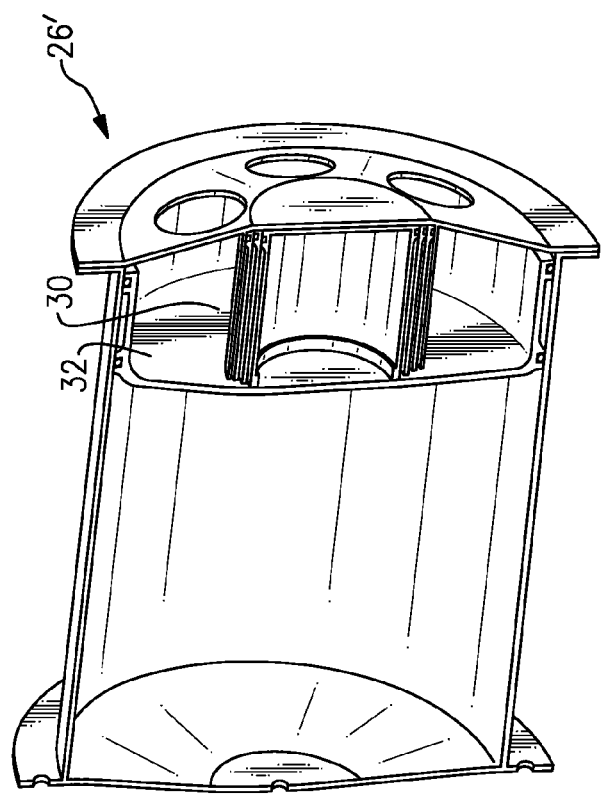

BOOTSTRAP ACCUMULATOR SYSTEM WITH TELESCOPING ACTUATOR CYLINDER

The present application claims priority to U.S. Provisional Patent Application No. 61/406,228, filed 25 Oct. 2010.

BACKGROUND

The present disclosure relates to a piston type accumulator used in a bootstrap type system, and more particularly to a telescope actuator cylinder therefor.

A conventional bootstrap piston type accumulator system provides an accumulator piston stroke that facilitates the required volume of retained fluid. This generally requires an equivalent additional stroke of an actuator piston which drives the accumulator piston within an accumulator cylinder. Although effective, the actuator piston is stacked upon the accumulator piston such that the total length may complicate packaging within confined areas such as are typical within an aircraft.

SUMMARY

A bootstrap accumulator system according to an exemplary aspect of the present disclosure includes a pressure loaded actuator cylinder that drives an accumulator piston within an accumulator cylinder through a multiple of nested actuator sleeves.

A method of driving an accumulator system according to an exemplary aspect of the present disclosure includes communicating a fluid into an actuator cylinder and telescoping a multiple of nested actuator sleeves comprising the actuator cylinder.

BRIEF DESCRIPTION OF THE DRAWINGS

Various features will become apparent to those skilled in the art from the following detailed description of the disclosed non-limiting embodiment. The drawings that accompany the detailed description can be briefly described as follows:

FIG. 3A is a sectional perspective view of a stacked piston actuator system in an empty position according to another non-limiting embodiment; and FIG. 3B is a sectional perspective view of a stacked piston actuator system in a recharged position according to another non-limiting embodiment.

DETAILED DESCRIPTION

Figure 1:
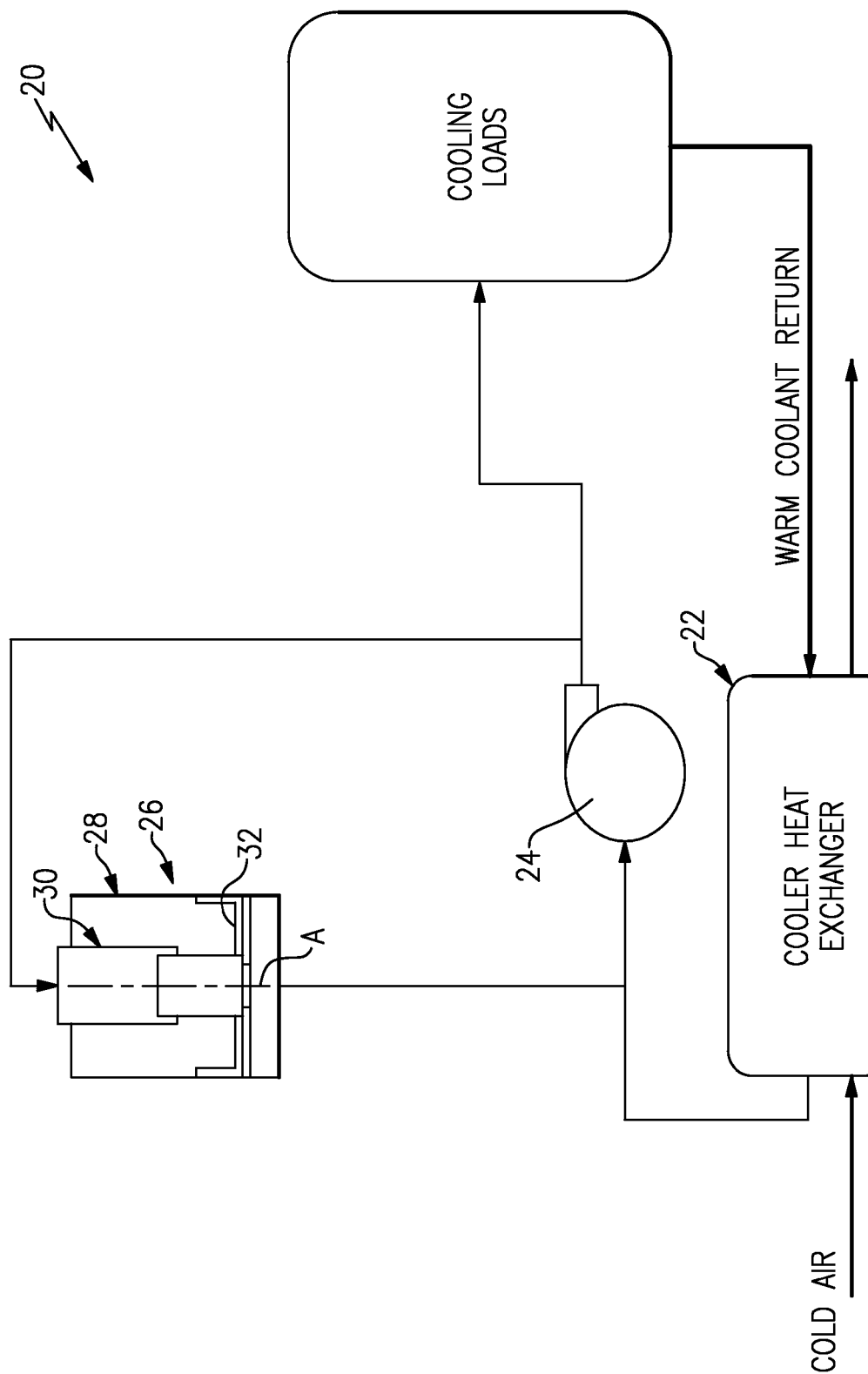
FIG. 1 is a schematic view of an aircraft cooling system.

FIG. 1 schematically illustrates a closed loop cooling system 20 such as that within an aircraft. The cooling system 20 generally includes a heat exchanger 22, a pump 24 and an accumulator system 26. The heat exchanger 22 operates to chill a coolant communicated by the pump 24 to a load which is to be cooled then returned to the heat exchanger in a closed loop manner. It should be understood that various systems other than the cooling system illustrated in the disclosed non-limiting embodiment will benefit from the accumulator system 26.

Discharge pressure downstream of the pump 24 is utilized to, for example, boost or bootstrap an inlet pressure to the pump 24 through the accumulator system 26 to provide elevated pressure at a pump inlet to assure efficient pump operation at altitude. That is, the accumulator system 26 may be used to, for example, maintain pressure in the closed loop cooling system 20 in response to temperature changes or other conditions. It should be understood that independent pressure sources or systems other than the pump 24 could alternatively be provided.

The accumulator system 26 generally includes an accumulator cylinder 28 and an actuator cylinder 30 which drives an accumulator piston 32 within the accumulator cylinder 28 along an axis A. The actuator cylinder 30 receives relatively high discharge pressure fluid from the pump 24 to apply a force to the accumulator piston 32. Accumulator pressure produced by the accumulator system 26 is generally a function of the proportional areas of the actuator cylinder 30 and the accumulator cylinder 28, as well as the discharge pressure differential of the pump 24.

Figure 2A:
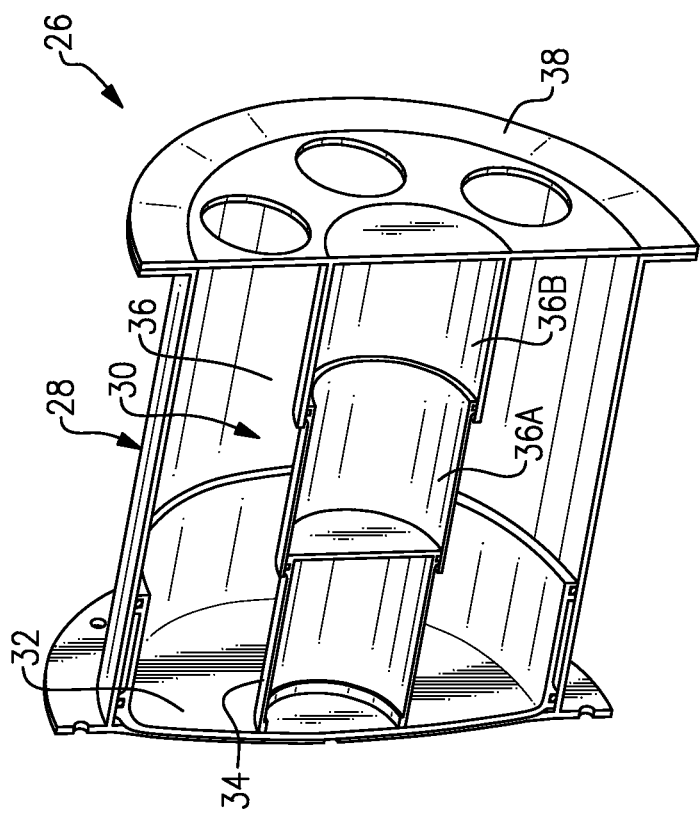
FIG. 2A is a sectional perspective view of a stacked piston actuator system in an empty position according to one non-limiting embodiment.

With reference to FIG. 2A, the actuator cylinder 30 generally includes an actuator piston 34 and a multiple of nested actuator sleeves 36. In one disclosed non-limiting embodiment, the actuator piston 34 is telescoped within a first actuator sleeve 36A which is in turn telescoped within a second actuator sleeve 36B. In this non-limiting embodiment, the base sleeve 36B is integral with the top cover 38.

The actuator piston 34 may be connected to, or separate but piloted into, the accumulator piston 32 and the actuator piston 34 is nested within one of the multiple of nested actuator sleeves 36 for movement relative thereto. The multiple of nested actuator sleeves 36 thereby provides a telescopic fluid filled actuator cylinder which utilizes high fluid pressure to extend the actuator piston 34 and the multiple of nested actuator sleeves 36. It should be understood that various seal rings or the like may be located between the piston and sleeves to facilitate a fluid seal therebetween. The actuator piston 34 may be air-filled to provide a relatively light weight low inertia arrangement.

Figure 2B:
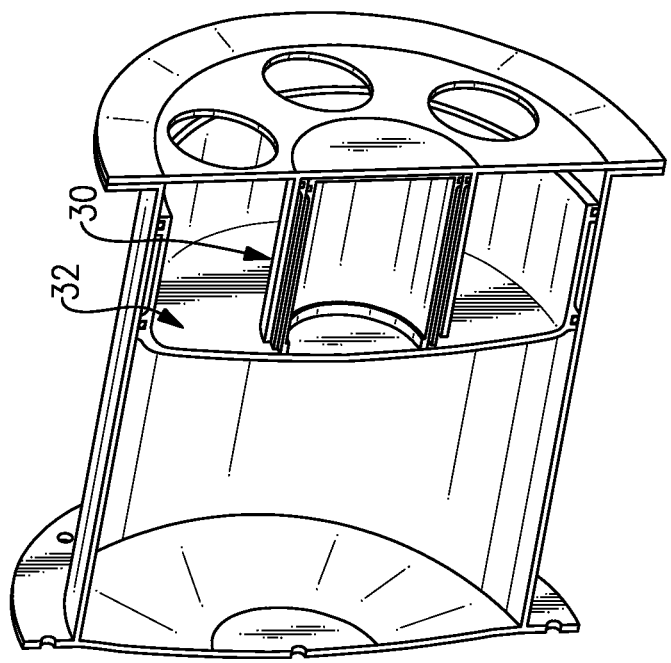
FIG. 2B is a sectional perspective view of a stacked piston actuator system in a recharged position according to one non-limiting embodiment.

The multiple of nested actuator sleeves 36 provide the actuator cylinder 30 with a retracted length (FIG. 2B) which may be half the length or less of a conventional actuator in which the stroke of the actuator and the accumulator piston are approximately equal. That is, the multiple of nested actuator sleeves 36 provides a significant reduction of overall length to thereby facilitate a compact package.

In another disclosed non-limiting embodiment, the actuator cylinder 30 is a stacked triple actuator 26' with three actuator sleeves 36A, 36B, 36C (FIGS. 3A, 3B). It should be understood that any number of actuator sleeves may alternatively be provided.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. An accumulator system comprising:
an accumulator cylinder having a cover with a plurality of openings;
an accumulator piston movable within said accumulator cylinder;
an actuator cylinder which drives said accumulator piston within said accumulator cylinder, said actuator cylinder includes a multiple of nested actuator sleeves, wherein the multiple of nested actuator sleeves includes a base sleeve integral with the cover of the accumulator cylinder, wherein the cover completely blocks the interior of the base sleeve such that fluid entering the accumulator cylinder enters through the plurality of openings in the cover without entering through the base sleeve; and
an actuator piston mounted to said accumulator piston, said actuator piston nested within at least one of said multiple of nested actuator sleeves, wherein said actuator piston is air-filled, wherein an interior surface of said actuator piston provides a partial boundary of an internal cavity, said internal cavity being air-filled, wherein a surface of said accumulator piston provides a partial boundary of said internal cavity, and wherein said internal cavity is completely enclosed by the combination of said surface of said accumulator piston and said interior surface of said actuator piston.

2. The accumulator system as recited in claim 1, wherein said multiple of nested actuator sleeves include two sleeves which telescope over said actuator piston.

3. The accumulator system as recited in claim 1, wherein said multiple of nested actuator sleeves are in communication with a pressure source.

4. The accumulator system as recited in claim 1, wherein said multiple of nested actuator sleeves are in communication with a pump.

5. The accumulator system as recited in claim 1, wherein said actuator piston is directly connected to said accumulator piston.

6. A method of driving an accumulator system comprising:
communicating a fluid into an accumulator cylinder through a plurality of openings in a cover of the accumulator cylinder; and
telescoping a multiple of nested actuator sleeves of an actuator cylinder, wherein telescoping the multiple of nested actuator sleeves drives an actuator piston, and wherein the actuator piston is air-filled, wherein the actuator piston is directly connected to the accumulator piston, wherein multiple of nested actuator sleeves includes a base sleeve integral with the cover of the accumulator cylinder, wherein the cover of the accumulator cylinder completely blocks the interior of the base sleeve such that fluid entering the accumulator cylinder enters through the plurality of openings in the cover without entering through the base sleeve.

7. A method as recited in claim 6, wherein telescoping the actuator piston drives an accumulator piston to bootstrap a cooling system.

8. The method as recited in claim 7, wherein an interior surface of the actuator piston provides a partial boundary of an internal cavity, the internal cavity being air-filled.

9. The method as recited in claim 8, wherein a surface of the accumulator piston provides a partial boundary of the internal cavity.

10. The method as recited in claim 9, wherein the internal cavity is completely enclosed by the combination of the surface of the accumulator piston and the interior surface of the actuator piston.

* * * * *